MEMORY DEVICES

Filed Jan. 25, 1957 3 Sheets-Sheet 1

INVENTORS: RICHARD L. GARWIN
HASKELL A. REICH
SOL TRIEBWASSER
BY John A. Hall
ATTORNEY INVENTORS: RICHARD L. GARWIN
HASKELL A. REICH
SOL TRIEBWASSER
BY John A. Hall
ATTORNEY INVENTORS: RICHARD L. GARWIN
HASKELL A. REICH
SOL TRIEBWASSER
BY John A. Hall
ATTORNEY United States Patent Office 2,897,399

Patented July 28, 1959

2,897,399

MEMORY DEVICES

Richard L. Garwin, Scarsdale, Haskell A. Reich, Bronx, and Sol Triebwasser, Brooklyn, N.Y., assignors to International Business Machines Corporation, New York, N.Y., a corporation of New York Application January 25, 1957, Serial No. 636,413

10 Claims. (Cl. 315—10)

This invention relates to memory devices by which coded information may be stored and extracted from storage at random times and at high speed and it particularly relates to optical storage of binary information useful in digital computers.

The object of the invention is to provide a compact device, extremely rapid in its operation by which selective access to any given storage area may be had for reading in or for reading out the codes for a plurality of items of information.

The invention consists essentially of a combined read-in and read-out means. The read-in means consists of an area such as the face of a cathode ray tube on which coded information in the form of spots of light may be made to appear, placed in cooperative relationship with a storage plate having a large plurality of subdivisions which may be selectively exposed to said information area and which, on such exposure, will record the said coded information by an image of such area. The storage plate is a transparent sandwich of electroluminescent and photoconductive material arranged as a very fine grain matrix of discrete cells each having two stable states, one dark and the other aglow whereby under electrical control a spot of light may be established through exposure to a ray of light and which will remain aglow thereafter. There will be before each said subdivision of said storage plate a lens and a light gate, the lens acting to focus an image of said information display area and the light gate acting to admit such image at any desired time. There may then be recorded on said storage plate as many images of said information display area as there are subdivisions of said plate and each may thus record a different item or group of items of information.

The read-out means consists of the said storage plate and its associated lenses and light gates, a lens to focus a selectively exposed subdivision of said plate on to a read-out surface and, arranged at said surface, a means to translate the spots of light formed thereon into an electrical manifestation and reproduction of the transmission which at some previous time had caused the unique arrangement of spots of light on said read-out area. This last means may be a conventional orthicon, vidicon, etc.

A semitransparent mirror is placed at an angle between said information area and said storage plate and does not materially hinder the light transmission therebetween but for transmission in the other direction will deflect the exposed image whereby mechanical interference between the cathode ray tube and the orthicon may be avoided.

The prior art contains a description of the basic elements of such a storage plate, particularly in an article entitled "Solid-State Image Intensifier" by Orthuber and Ullery which appeared in the Journal of the Optical Society of America, volume 44, pages 297–299; April 1954 and which was reprinted in "Electrical Communication" for September, 1954, pages 198–201.

Other pertinent articles constituting prior art disclosures may be found in the Proceedings of the I.R.E. for December 1955, page 1882 et seq. Attention is directed to the articles "Theory and Experiments on a Basic Element of a Storage Light Amplifier" by J. E. Rosenthal, page 1882 et seq., "An Electroluminescent Light-Amplifying Picture Panel" by Kazan and Nicholl, page 1888 et seq. and "Opto-Electronic Devices and Networks" by E. E. Loebner, page 1897 et seq. The use of a matrix of discrete light cells is disclosed in the copending patent application of Willard et al., Serial Number 550,931, filed December 5, 1955.

Each separate area of the storage plate used to record a separate image of the information area or face of the cathode ray tube is smaller than the face of the cathode ray tube so that the image is reduced in size. Such reduced image is then enlarged as it is later transmitted to the face of the orthicon. It is to be noted that the fine mesh matrix of what may be termed light cells is dimensioned so that each spot of light beamed thereon will play on an area containing a plurality of light cells, making it possible to confine a spot in an area which will not overlap an adjacently glowing spot. In this manner the internal energization of a spot aglow will not be communicated to an adjacent spot so as to trigger such adjacent spot.

It is conventional to use cathode ray tubes as memory devices but this entails the use of regenerative circuits if information stored on the face thereof is to be maintained. The present invention therefore provides an optical means for recording the information which may be expressed on the face of such a tube and for holding it in storage for an indefinite period and this provides means for storing a very much greater amount of information that can be economically stored in such electronic devices and still have the advantages of substantially instant access. The storage of information on the face of a cathode ray tube is set forth in the copending patent application of Havens et al., Serial Number 444,253, filed July 19, 1954.

A feature of the invention is a four coordinate address memory device in which the address of any given bit is fixed by its two coordinate location within a display area and the two coordinate location of the image of such display area on the storage medium. The total capacity of such a memory is very large since experience with the Havens et al. electrostatic storage means clearly demonstrates that a great amount of information may be displayed on the face of a single cathode ray tube and since the images of this display may be very greatly reduced in size, for recording, the multiplication factor becomes correspondingly great and is limited from a practical standpoint only by the fine grain structure of the light cell matrix.

Another feature of the invention is the use of an image intensifier interposed in the path of the transmission from the storage surface to the surface of the orthicon whereby the image as it becomes enlarged in this path may also be intensified to provide adequate binary information on the face of the orthicon capable of high speed detection and use. While the limiting factor now appears to be the fine grain structure of the image storage plate, it is anticipated that as this becomes greatly improved the intensity of the light spots under further image reduction may require such an intensification as that provided by this feature.

Another feature of the invention is a means for transmitting a large amount of information in the form of bits simultaneously. While the information displayed on the face of the cathode ray tube is transmitted thereto sequentially, nevertheless through the persistance effect of such tube it will be completely at hand when the light gate to the image storage plate is opened so that all of the many bits each expressed by a spot of light will be simultaneously transmitted. Likewise, on read-out, when the image stored is being transmitted to the orthicon, where the detection of the bits in their series relation one to the other will take place, all of the many bits stored will be transmitted simultaneously. Therefore, the present invention includes means for processing information expressed by bits in code for first transmitting them serially and manifesting them in a coordinate configuration on a surface where, by persistence of the effect produced, they may thereafter be simultaneously transmitted to another surface where each will be retained by the triggered stable state of the surface on which they fall. Likewise when a stored image is transmitted to the photo cathode of the image orthicon, all the elements of the codes for expressing the items of information so stored are transmitted simultaneously. The image thus transferred to the orthicon is then dissected and the various bits are then transmitted sequentially.

A feature of the invention is the use of light cells having two stable states one dark and the other aglow. A cell in its dark state may be triggered aglow by a beam of incident light and will thereafter remain aglow through light feedback and the resulting lowered resistance of the photoconductive material. A cell aglow may be returned to its dark stable state by interruption of the said electrical current, by infrared quenching or by other means.

Another feature of the invention is a storage plate having thereon a plurality of discrete areas each of which may be employed to store an image. By the use of a separate electrode for each of said areas, the image stored thereon may be separately controlled, that is erasure of an image may be achieved by interruption of the current flow through the said separate electrode.

Another feature of the invention is a means in the storage area responsive to the partial illumination of a plurality of light cells to store an increased light intensity, advantage being taken of the tendency for the glow produced to spread through the feedback effect. The light ray used to transmit a bit from the face of the cathode ray tube to the storage area will be in the form of a pencil of light which may not completely cover the entire area of a group of light cells and will therefor only partially cover some of them. Nevertheless, those cells which are only partially covered by the incident light will be triggered aglow and will thereupon present a full area of glow so that the overall effect is an intensification of the light provided by the incident ray and becomes useful as a means for supplying spots of glow of uniform intensity for read-out purposes.

Since it would be very difficult to fashion a beam of light to impinge on a single light cell and to aim it accurately enough for this purpose, and, moreover, since a fine grain matrix is highly desirable, it is arranged in accordance with the present invention to aim the beams only accurately with respect to each other and to trigger those light cells on which the beams impinge at random with the result that a group of cells will be triggered, some fully and others partially and all of those triggered, whether fully or only partially, will thereupon become fully aglow, thus providing a storage area somewhat intensified and fully aglow.

Another feature of the invention is a means for biasing either the whole area of the storage plate or selected areas thereof by flooding the back or selected portions of the back with regulated intensity light so as to lower the resistance of the photoconductive material, not enough to trigger any light cell but sufficiently to make such cells responsive to faint illumination. Also, by such means, this optical bias may be used as a control, for if the proportions of the various layers and the value of the maintaining potential are regulated so that such a bias is necessary to maintain the cells aglow in such a steady state, then the removal of such a light bias will act as a releasing means.

In accordance with this feature the use of infrared light is featured as a convenient and effective biasing means, or, alternatively, as an erasing means.

Other features will appear hereinafter.

The drawings consist of three sheets having nine figures, as follows.

Figure 5:
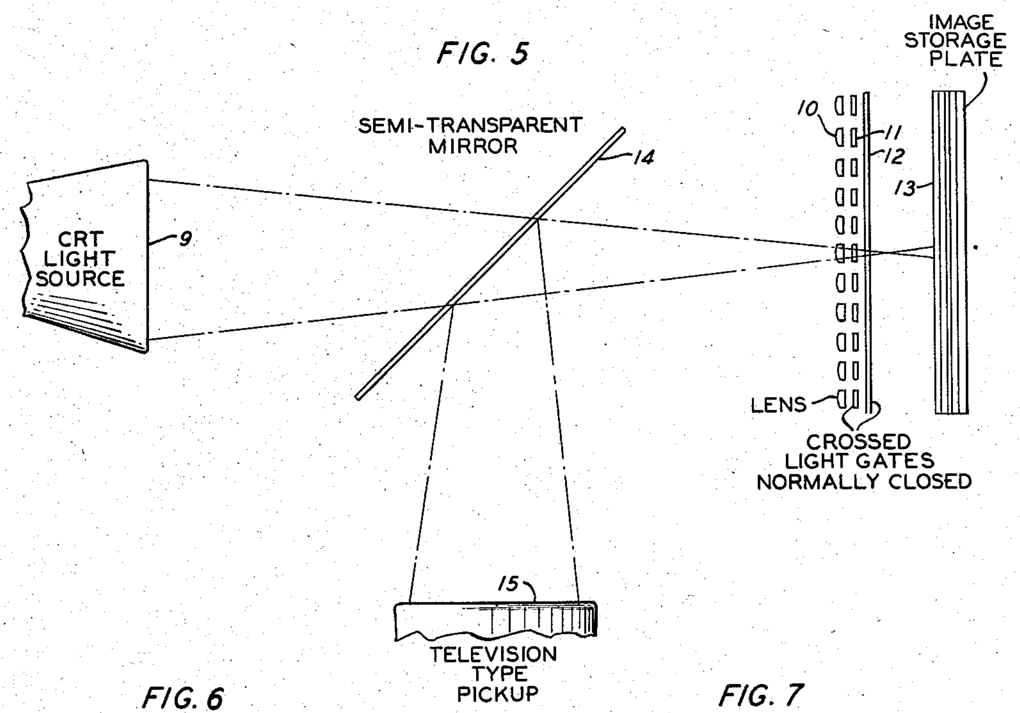
Fig. 5 is a schematic diagram showing the fundamental cooperative relationships of the essential elements of the present invention.
Figures 6, 7, 8:
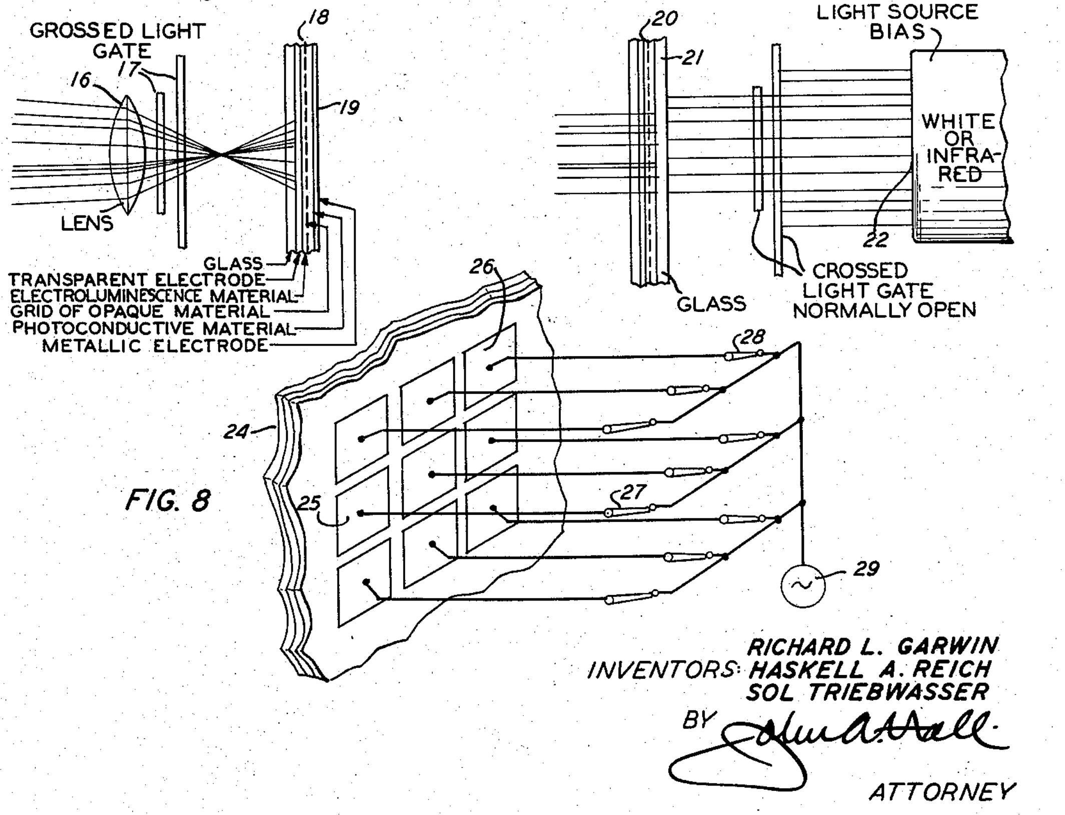
Fig. 6 is a fragmentary schematic diagram showing a very small portion of the diagram Fig. 5 in which the rear electrode of the storage plate is a metallic sheet since in one arrangement it is not contemplated to transmit light therethrough.
Fig. 7 is another fragmentary sketch showing how the rear lamination of the storage plate may be constructed of a transparent material such as glass and how one storage area of a plurality thereof may be flooded with light of any given quality under control of a light gate for the proper biasing and control thereof.
Figure 9:
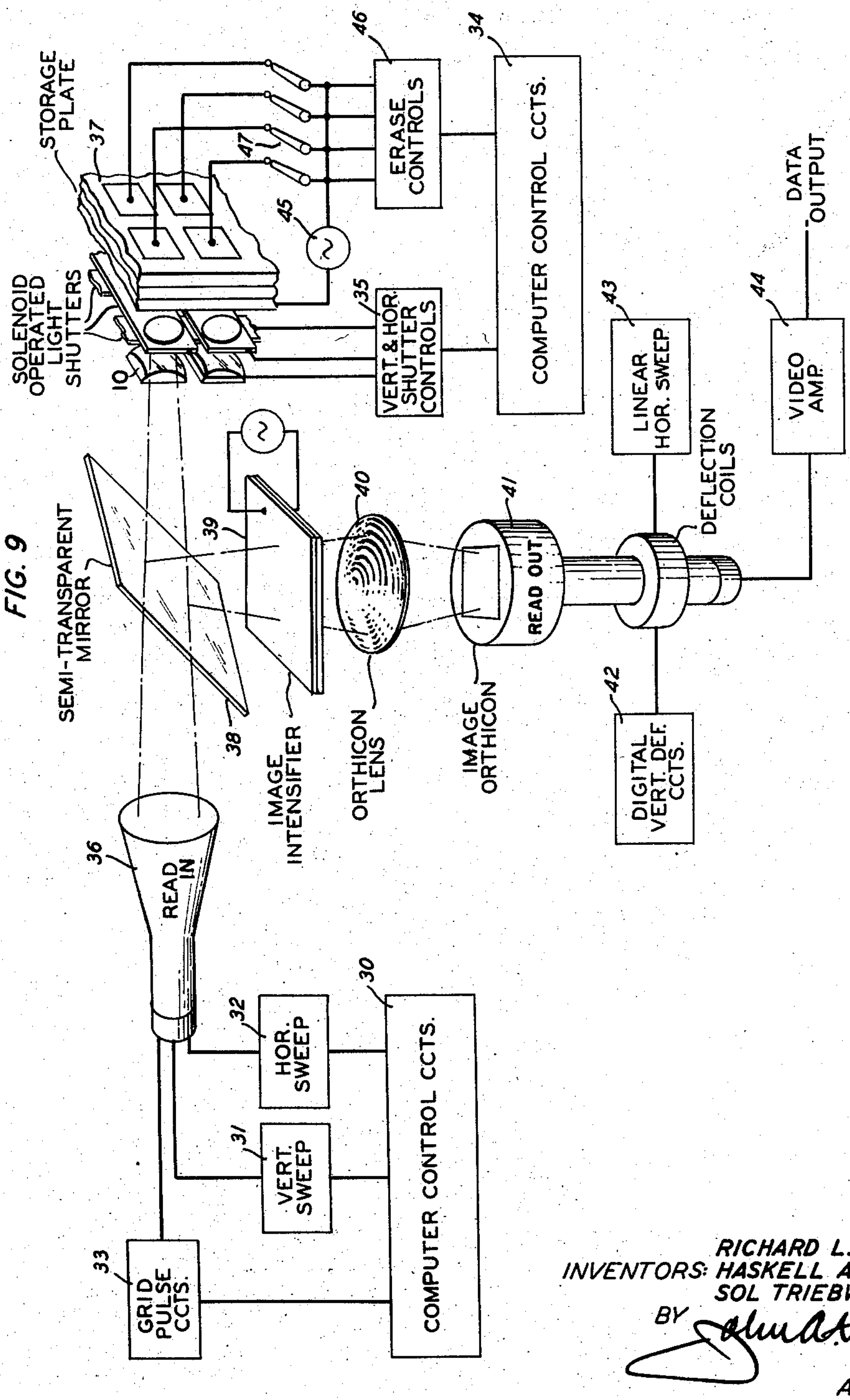

Fig. 8 is a fragmentary perspective sketch of a storage plate and a schematic circuit diagram showing how images at different addresses may be selectively controlled by the separate control of the connection of the sustaining potential to separate electrodes for the various record or image areas; and Fig. 9 is a schematic drawing similar to that of Fig. 5, but including additional details, such as an image intensifier placed in the path of an image on read-out and certain conventional circuit means to indicate how the transmission of images on read-in and on read-out may be controlled.

The storage unit of the present invention in its fundamental aspects is conventional. It consists essentially of a composite flat screen or sandwich having a layer of electroluminescent material and a layer of photoconductive material sandwiched in between two conducting plates. The electroluminescent material and the photoconductive material constitute a voltage divider between the said two electrodes and since the photoconductive material in its dark state is characterized by high resistance, the major portion of the potential between the two electrodes is applied thereacross and consequently the potential applied across the electroluminescent material is low. If, however, the photoconductive material is subjected to light, its resistance is lowered with the consequence that the potential across the electroluminescent material rises to the point where under the influenec of such raised potential it is caused to glow.

In one form of such a device employed herein, when the electroluminescent material is set aglow by incident light the effect on the contiguous photoconductive material is to render it more conductive whereby the potential across the electroluminescent material is raised and this also causes this material to glow, whereby the glow triggered by incident light is maintained by this feedback effect. Such a sandwich is bistable, that is, it will remain aglow after it has been triggered by incident light so long as the potential across the combination is maintained. When the light transmitted to the photoconductive material is interrupted, the glow will be stopped and the device will remain indefinitely in this dark state. Should there be no light bar between the electroluminescent material and the photoconductive material and should this sandwiched device be triggered at some spot on its surface, the glow produced at this spot will quickly spread and soon the complete sandwich will be aglow.

For the purposes of the present invention where the glow must be confined to the triggered areas, a fine mesh screen of opaque insulating material is formed between the layer of electroluminescent material and the photoconductive material thus forming in the sandwich a fine mesh screen of discrete light cells.

Figure 1:
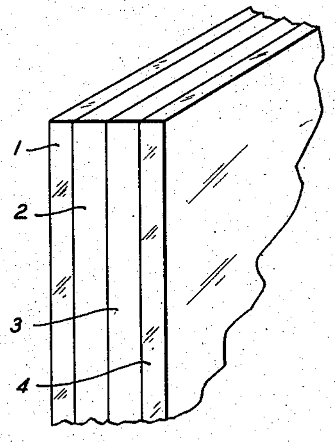
Fig. 1 is a perspective drawing of a small portion of a composite solid state image intensifier useful in explaining the fundamental stratified construction thereof.

As indicated by Fig. 1, fundamentally, the sandwiched light responsive unit of the present invention consists of a layer 1 of transparent current conducting material, a layer 2 of electroluminescent material, a layer 3 of photoconductive material, and a layer 4 of transparent current conducting material. All of these materials and the complete sandwich are conventional.

Figure 2:
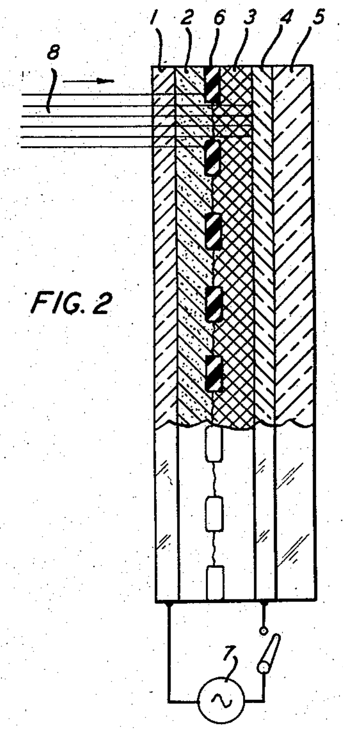
Fig. 2 is a cross sectional view of such a plate provided with a very fine grain mesh of opaque electrical insulating material formed within the area of contact between the layer of electroluminescent material and the photoconductive material to form a fine grain matrix of discrete light cells.

As indicated in Fig. 2, such a sandwich may be laid on to a layer 5 of glass or the sandwich itself may be sandwiched in between two layers of glass 5. In accordance with one form of such a unit used herein for storage purposes a fine screen grid 6 of opaque insulating material may be sandwiched in between the layer 2 of electroluminescent material and the layer 3 of photoconductive material. When a source of current 7 is connected to the two plates 1 and 4 of conducting material, the potential thereof will be applied across the layers 2 and 3 and if the device is in its dark state the major portion of this will be effectively placed across the high resistance plate 3. If now a ray of light 8 is directed from the left toward this sandwich, the light penetrating one of the apertures in the mesh 6 will cause the resistance of the photoconductive material thus illuminated to become lesser in value whereby the potential of the contiguous bit of electroluminescent material will increase and this increase in turn will induce the electroluminescent material to glow. The glowing of this area maintains the adjacent photoconductive material in a low resistance state, thus affording a feedback effect whereby such a cell, triggered by the incident light of ray 8 will remain in one of its two stable states.

Figure 3:
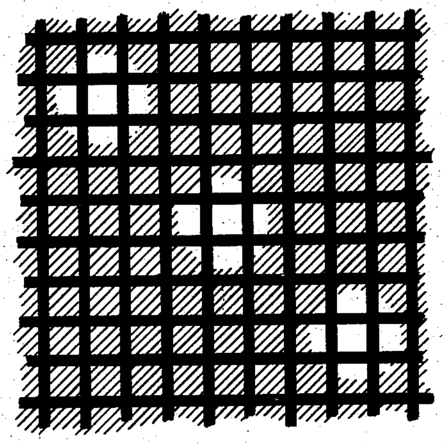
Fig. 3 is a very greatly enlarged front view of such a fine grain matrix showing how several light beams may be directed to spots on the storage area to trigger a plurality of such light cells.
Figure 4:
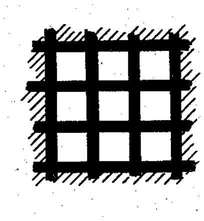
Fig. 4 is a similar figure of an area in which nine coordinately arranged light cells triggered as indicated in Fig. 3 are maintained aglow throughout the storage time, it appearing that through the feedback operation of these cells some of them having been triggered only over a partial area thereof have become fully luminescent.

Thus the insertion of a fine grain screen 6 of opaque insulating material between the layer 2 of electroluminescent material and the layer 3 of photoconductive material which is then compressed until these two materials come in contact with each other in the apertures of this screen forms a great plurality of separate or discrete light cells, which may be triggered by incident light rays 8, over areas as indicated in Fig. 3 and which through the feedback effect will come aglow as indicated in Fig. 4.

It may be noted that if the screen 6, of Fig. 2, is flattened out into a thin continuous layer, an image intensifier will be formed whereby a ray of light directed from the right on to the photoconductive area will cause the resistance thereof at that point to be lowered so that the potential across the corresponding electroluminescent area will be greatly increased and the material caused to glow. Such a device may be placed in the path of a ray of light and will act as an image intensifier. The thin layer of opaque material between the layers 2 and 3 prevents feedback and therefore prevents spreading of the glow. Such image intensifiers are herein considered conventional.

Now in accordance with the present invention a storage plate is made up as shown in Fig. 2. In Fig. 3 a greatly enlarged mesh of opaque insulating material is represented by the heavy black vertical and horizontal lines and the high resistance state of the photoconductive material is indicated by the hatching in the open parts of the mesh. In this Figure 3, three circular clear spots each extending over an area including a plurality of cells are shown to represent incident light of three beams directed to the storage plate on the electroluminescent side thereof. This incident light will trigger each of these cells so that a substantially square area, as indicated in Fig. 4, will come aglow and this area will be maintained in such a steady state so long as the connections from the source of current 7 are maintained unbroken.

In Fig. 5 a basic form of the invention is shown. At the left, there is a CRT light source 9, on the face of which the information is expressed conventionally as on the cathode ray tubes of the system disclosed by Havens et al. Placed in parallel relation thereto is a matrix of small lenses 10, then the horizontal and vertical bars of the crossed light gates 11 and 12 and lastly the storage plate 13. The distance between the lens 10 and the plate 13 is such that the image of the face of the cathode ray tube 9 is sharply focussed on the storage plate so that each bit appearing on the information area will be directed as a ray of light to a separate and distinct group of light cells, as illustrated in Fig. 2. The light gates are here expressed merely as bars to represent means which through the selective operation of one horizontal bar 11 and one vertical bar 12 will remove an obstruction in the beam from a correspondingly situated lens. These may be mechanical, as strips of metal each of which may be moved by electromagnetic means so as to partially open the gates of a full vertical or horizontal row. Alternatively, the light gates may be composed of strips of crystal such as ADP (ammonium dihydrogen phosphate disclosed in Patents 2,649,027 and 2,467,325 issued to W. P. Mason) or any other conventional and suitable means.

By means of such light gates the different areas of the storage plate 13 may be selectively exposed to record an image of the information area 9 in a considerably reduced form and this image, as explained, may be retained indefinitely or until the sustaining potential is removed to bring to an end the energization of these light cells or luminous capacitors.

A semitransparent mirror 14 is placed in the path of the image beam from the CRT 9 to the storage plate 13 and while this reduces the intensity of the image at the plate 13, it does not interfere beyond tolerable limits. The mirror 14 is provided for deflecting an outgoing beam from the storage plate 13 to a read-out area where the image may be viewed, such as the area 15 herein marked television type pickup which may be the face or cathode of a conventional orthicon.

Fig. 6 is a fragmentary sketch showing the relation between a lens 16, a light gate 17, and a storage plate 18, and in which the rear electrode 19 of this plate is metallic and opaque, it being not contemplated in such an arrangement that the backing be subjected to light, either light transmitted therethrough or light directed thereto for biasing purposes or for record releasing purposes.

Fig. 7 is a fragmentary sketch showing one manner by which a record in the form of a recorded image may be controlled. Herein a plate 20 is provided with a rear lamination 21 of glass so that the whole storage area in which one complete image is recorded may be flooded with light of regulated intensity from any conventional light source 22 so as to bias the plate 20 to respond to the incident rays from the information area. In order to have selective control of the different areas each under control of a different lens, light gates may be used to regulate the biasing of these different areas, it being understood that in such a case the composite storage plate is so constructed and arranged that a light bias will be necessary to render it operative and that when this biasing light is shut off by the closing of such a light gate, the sandwiched plate will neither respond to incident light nor maintain triggered cells aglow. Alternatively, and by a similar arrangement in which the light gate is normally closed, such area may be flooded with infrared light for the purpose of erasing a stored image.

Fig. 8 is another fragmentary sketch showing how the rear electrode of such a storage plate may be divided into a plurality of separate electrodes, each separately controlled whereby any given image may be erased by selectively opening the circuit to the supply of the sustaining potential. Thus the rear of the storage plate 24 may be provided with a plurality of separate metallic electrodes 25, 26, etc. and each may be separately controlled by a circuit breaker 27 or 28 respectively by which the connection of the source 29 thereto may be interrupted.

Fig. 9 is a schematic diagram essentially like that of Fig. 5, but on a different scale and somewhat more useful to explain the principles of the invention. For the sake of simplicity, but four lens and light gate combinations are shown before the storage plate and the light gates are indicated as being worked mechanically by the movement of horizontal and vertical shutters. Such lens and light gate combinations are shown in general in Fig. 5 and in greater detail in Fig. 6.

The circuitry may be taken in principle almost directly from the Havens et al. application, only slight and routine changes being made to adapt such prior art circuits to present uses, such for instance as reading out at a time different from reading in. It will be noted here that reading out and reading in are always separated in time, whereas in the prior art system the reading out means consisted of plates fitted to the faces of the cathode ray tubes and that reading out and reading in were always simultaneous.

Fundamentally, the reading in consists of conventional circuits for driving the beam of the cathode ray tube over a standard raster, here represented by the computer control circuits 30 working into the vertical sweep circuits 31 and the horizontal sweep circuits 32 and the means for brightening desired spots along the said raster by means of the computer control circuits 30 working into the grid pulse circuits 33. The present system is a four coordinate address storage since the vertical and horizontal location of a bit depends on the vertical and horizontal location of a spot and the vertical and horizontal location of an image depends on the particular vertical and horizontal shutters of the light gates selectively operated by the computer control circuits 34 working in to the vertical and horizontal shutter controls 35. In accordance with the present invention the grid pulse circuits feed the information into the cathode ray tube 36 in seriatim and when the record is formed on the face of the tube the proper shutters are opened and the image as a whole is transmitted to and recorded on the storage plate 37.

At some other time, when the circuits 30 to 33 are inactive, the proper shutters are opened and the image on the corresponding area of the storage plate 37 is reflected by the semi-transparent mirror 38 through an image intensifier 39, through the orthicon lens 40 to focus the image on the cathode of the orthicon 41. There the beam traveling over a standard raster under control of the vertical sweep circuit 42 and the horizontal sweep circuit 43 renders the information available to the video amplifier 44 so that the mass of information thus transmitted simultaneously to the read-out surface is translated into pulses in seriatim. It should be noted that the image intensifier 39 is not needed in a system such as shown where the stored image is comparatively large and the separate glowing spots are large, but in a much more practical system having a larger number of vertical and horizontal coordinates and recording images on smaller and more numerous areas the image intensifier would become a useful adjunct of the system.

It is to be noted that it is necessary in recording to have the glowing spots on the face of the CRT 36 not more than sufficiently bright to trigger the light cells on which their images fall. Thereafter and through the feedback effect as explained in connection with Figs. 3 and 4 the brightness of the recorded spots will automatically be raised to a standard level depending on the potential supplied by the source 45.

It is believed to be clearly apparent that the maintenance or the erasure of stored images may be controlled from the computer control circuits 34 through the erase controls 46 which may control the separate switches such as the circuit breaker 47 for the breaking of the circuit from the source of sustaining potential.

What is claimed is:

1. A memory device consisting of a means for displaying a plurality of items of information coded in discrete spots of light on a substantially plane display surface, an image storage plate placed in parallel relation thereto, said image storage plate having a fine grain matrix of bistable light cells each capable of being triggered to an active state by incident light, and a plurality of lenses interposed between said display surface and said image storage plate, said plurality of lenses being each for focusing an image of said display surface on to a different and separate area of said image storage plate and a light gate for each said lens, and means for selectively operating said light gates to selectively expose said different and separate areas of said image storage plate to images of said display surface.

2. A memory device consisting of an image storage plate having a fine grain matrix of bistable light cells each capable of being triggered to an active state by incident light, said plate containing a plurality of different and separate areas, a lens and a light gate placed before each said separate area, means for selectively operating said light gates, a means for displaying a plurality of items of information coded in discrete spots of light on a substantially plane display surface placed in parallel relation to said image storage plate, each said lens being constructed and arranged to focus a reduced size image of said display surface on its said associated separate area of said image storage plate, a read-out surface also placed in parallel relation to said image storage plate, a lens before said read-out surface for focusing an enlarged image of each of said separate areas of said image storage plate thereon and means for separating the beams between said display surface to said image storage plate lenses from the beams between said image storage plate and said read-out surface.

3. A memory device consisting of an image storage plate having a fine grain matrix of bistable light cells each capable of being triggered to an active state by incident light, said plate containing a plurality of different and separate areas, a lens and a light gate placed before each said separate area, means for selectively operating said light gates, a means for displaying a plurality of items of information coded in discrete spots of light on a substantially plane display surface placed in parallel relation to said image storage plate, each said lens being constructed and arranged to focus a reduced size image of said display surface on its said associated separate area of said image storage plate, a read-out surface also placed in parallel relation to said image storage plate, a lens before said read-out surface for focusing an enlarged image of each of said separate areas of said image storage plate thereon and means for separating the beams between said display surface to said image storage plate lenses from the beams between said image storage plate areas and said read-out surface, said last means consisting of a semi-transparent mirror placed at an angle between said display area and said storage area and arranged to transmit image beams directly therebetween and to deflect image beams between said storage areas and said read-out area whereby physical interference between said display area and said read-out area may be avoided.

4. A memory device consisting of a means for displaying a plurality of items of information coded in discrete spots of light on a substantially plane display surface, an image storage plate placed in parallel relation thereto, said image storage plate having a fine grain matrix of bistable light cells each capable of being triggered to an active state by incident light and maintained in an active state by the application of an electrical potential thereto, and a plurality of lenses interposed between said display surface and said image storage plate each for focusing an image of said display surface on to a different and separate area of said image storage plate and a light gate for each said lens and means for selectively operating said light gates to selectively expose said different and separate areas of said image storage plate to images of said display surface and an electrical circuit having a separate branch and a circuit breaker for each said different and separate area of said image storage plate for selectively switching all active light cells therein to their inactive stable states by control of said potential.

5. A memory device consisting of an image storage plate having a fine grain matrix of discrete bistable light cells each capable of being triggered to an active state by incident light, said plate including a plurality of individual storage areas, a light gate and a lens before each said area, a read-out surface in parallel relation to said image storage plate, said lenses and light gates being interposed between said read-out surface and said image storage plate, another lens interposed between said read-out surface and said image storage plate for enlarging and focusing an image exposed by any one of said first lenses through selective operation of said light gates, a solid-state image intensifier interposed between said enlarging lens and said read-out surface, and means for translating an intensified and focused image on said read-out surface into items of information.

6. A four coordinate address memory device consisting of an image storage plate having a fine grain matrix of discrete bistable light cells each capable of being triggered to an active state by incident light, said plate including a plurality of individual storage areas, a light gate and a lens before each said area, a display area in parallel relation to said image storage plate, means to display items of information on said display area in coordinately arranged and coded discrete spots of light, first and second coordinates serving to define the address of a given item of information on said display area and an image of said display area stored in a given one of said individual storage areas and third and fourth coordinates serving to define the address of said individual image storage area, and means for selectively operating said light gates under third and fourth coordinate address control.

7. A memory device consisting of an image storage plate having a fine grain matrix of discrete bistable light cells each capable of being triggered to an active state by incident light, a read-in surface in parallel relation to said image storage plate, a plurality of lenses and associated light gates between said read-in surface and said image storage plate for selectively exposing different areas of said image storage plate to said read-in surface, means for illuminating said read-in surface by discrete spots of light coded to express items of information, each said spot of light constituting a ray of incident light at said image storage plate of sufficient intensity to trigger a plurality of light cells of which some are completely and others are incompletely covered thereby, and feedback means in said image storage plate light cells for bringing each triggered cell up to a standard brightness regardless of the intensity of the triggering incident light applied thereto.

8. A memory device consisting of an image storage plate having a fine grain matrix of discrete light cells each capable of being triggered aglow by incident light, each said cell consisting of a sandwich of electroluminescent material and photoconductive material and a pair of electrodes disposed as outside layers of said sandwich, a source of potential connected to said electrodes, said photoconductive material having a high resistivity when dark and a low resistivity when flooded with light whereby in the dark state of said photoconductive material the effective potential across said electroluminescent material is comparatively low and in the light state of said photoconductive material the effective potential across said electroluminescent material is comparatively high, and means for triggering said cells aglow by flooding the said photoconductive material thereof with light sufficient to raise the potential across the said electroluminescent material to a value great enough to produce a glow therein.

9. A memory device consisting of an image storage plate having a fine grain matrix of discrete light cells each capable of being triggered aglow by incident light, each said cell consisting of a sandwich of electroluminescent material and photoconductive material and a pair of electrodes disposed as outside layers of said sandwich, a source of potential connected to said electrodes, said photoconductive material having a high resistivity when dark and a low resistivity when flooded with light whereby in the dark state of said photoconductive material the effective potential across said electroluminescent material is comparatively low and in the light state of said photoconductive material the effective potential across said electroluminescent material is comparatively high, and means for triggering said cells aglow by flooding the said photoconductive material thereof with light sufficient to raise the potential across the said electroluminescent material to a value great enough to produce a glow therein, and means to flood the photoconductive material of all of said cells with light insufficient to trigger said cells, whereby said cells may be triggered by rays of incident light insufficient alone for the purpose.

10. A memory device consisting of an image storage plate having a fine grain matrix of discrete light cells each capable of being triggered aglow by incident light, each said cell consisting of a layer of electroluminescent material and a layer of photoconductive material sandwiched between a pair of electrodes, a source of potential connected to said electrodes, a source of infrared light for biasing a plurality of said cells to respond to otherwise insufficient triggering light and means for returning glowing cells to their normal dark state consisting of means for interrupting said supply of infrared light.

References Cited in the file of this patent

UNITED STATES PATENTS

| | | |
|---|---|---|
| 2,474,628 | Hurvitz | June 28, 1949 |
| 2,693,734 | Coleman | Nov. 9, 1954 |
| 2,790,088 | Shive | Apr. 23, 1957 |
| 2,830,285 | Davis | Apr. 8, 1958 |